UNITED STATES PATENT OFFICE.

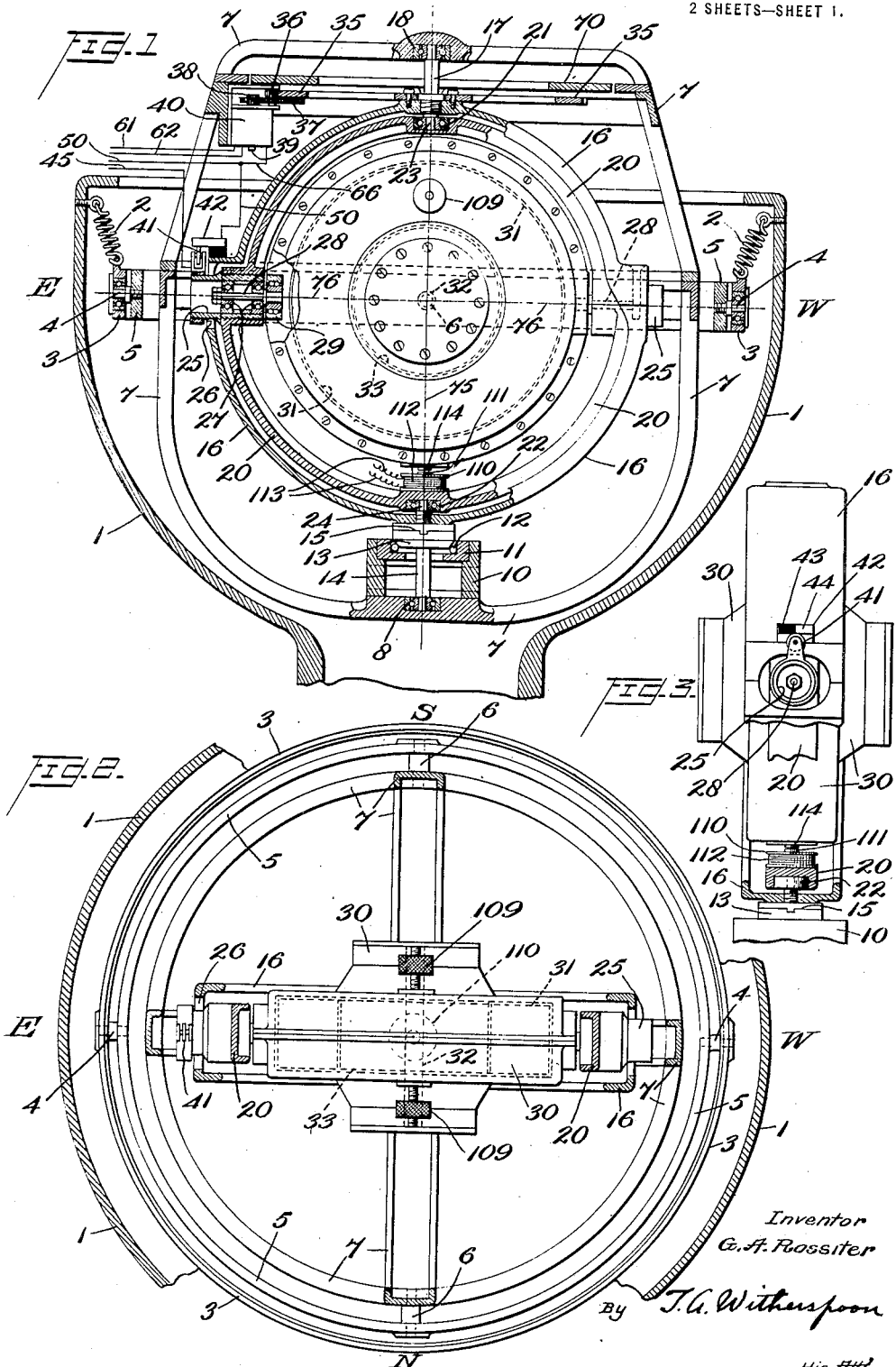

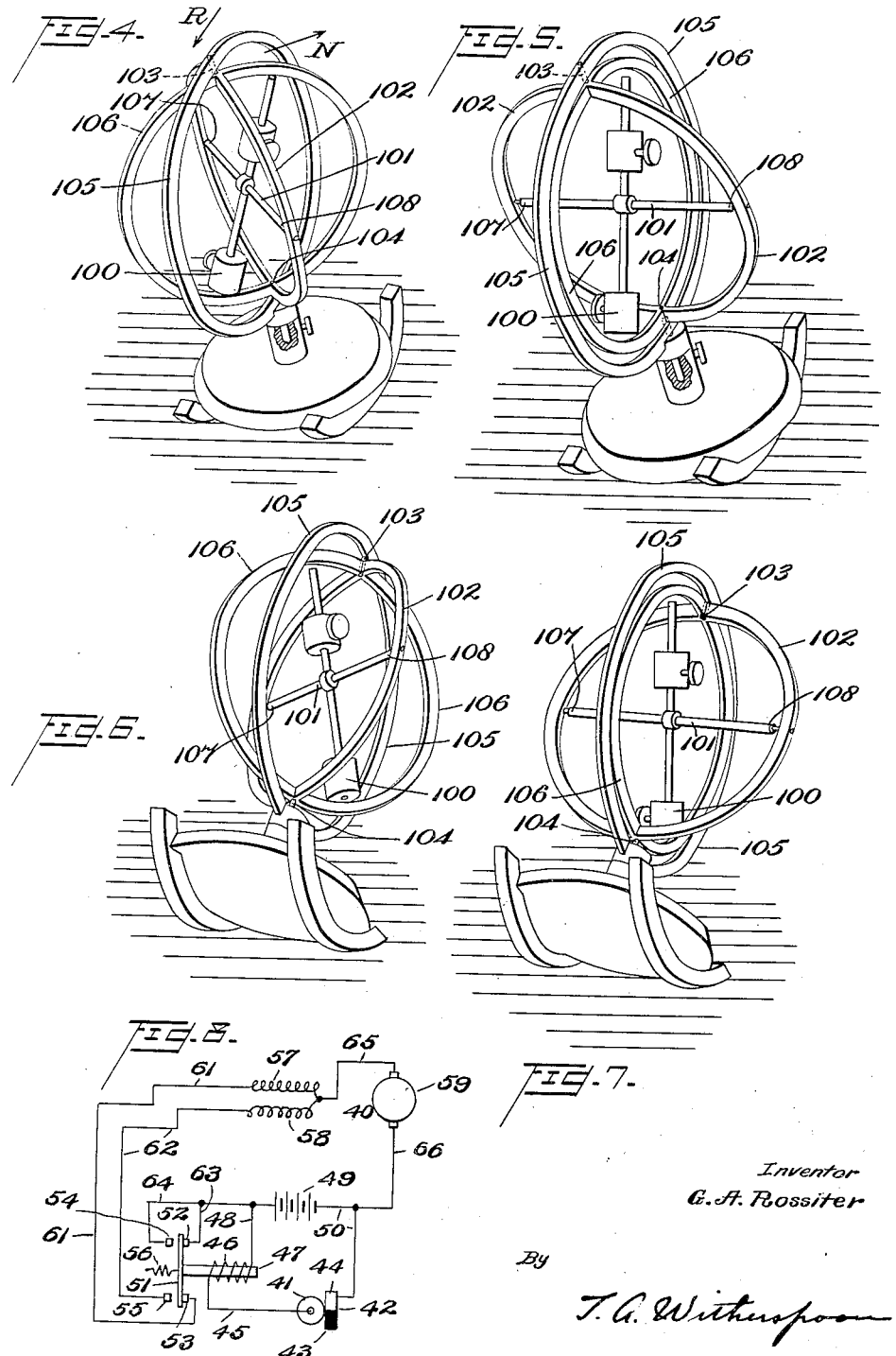

GEORGE A. ROSSITER, OF BROOKLYN, NEW YORK, ASSIGNOR TO THE CARRIE GYROSCOPIC CORPORATION, OF NEW YORK, N. Y., A CORPORATION OF NEW YORK.

GYROSCOPIC COMPASS.

1,386,030.      Specification of Letters Patent.      Patented Aug. 2, 1921.

Application filed October 2, 1919. Serial No. 327,898.

*To all whom it may concern:*

Be it known that I, GEORGE A. ROSSITER, a citizen of the United States, residing at Brooklyn, in the county of Kings and State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses and has for one of its objects to provide an instrument of this character which will be simple in construction and more efficient in action than those heretofore proposed.

With this and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a diagrammatic sectional elevational view of an instrument made in accordance with this invention;

Fig. 2 is a sectional plan view of a portion of the parts shown in Fig. 1;

Fig. 3 is a side elevational view of the directive element shown in Fig. 1;

Figs. 4, 5, 6 and 7 are perspective views of a model illustrating certain of the principles involved in the present invention; and Fig. 8 is a diagrammatic view illustrating the electric circuits of a portion of the apparatus shown in Fig. 1.

1 indicates a binnacle bowl or casing, from which is suspended by means of the springs 2, an outer Cardan ring 3, within which is pivoted as by the studs 4, an inner Cardan ring 5. Pivoted within the said inner ring 5 on the trunnions 6 is a main frame 7, the said trunnions 6 being at an angle of substantially 90° from the studs 4, so as to provide a Cardan suspension for the said frame 7.

The main frame 7 is provided at its lowermost part with an anti-friction bearing 8, and also with an annular supporting member 10, carrying an outer race 11, in which travel the anti-friction balls 12. 13 designates an inner race which is provided with a stem 14, extending downwardly and engaging the inner race of the bearing 8 as shown.

Supported upon the race 13, as by the readily detachable connection 15, is the follow up or shadow ring 16, which is provided at its upper portion with the vertical pivot stud 17, journaled in the anti-friction bearing 18, carried by the main frame 7.

Concentrically mounted within the shadow ring 16 is the vertical ring 20, carrying the anti-friction bearings 21 and 22, mounted respectively upon the extension 23 of the stud 17, and the extension 24 of the connection member 15, as will be clear from Fig. 1.

The said vertical ring 20 is provided at diametrically opposite points with the horizontal trunnion sleeves 25, projecting through openings 26 in the shadow ring 16, and housing the anti-friction bearings 27, which carry the horizontal trunnions 28, which support by means of the anti-friction bearings 29, the casing or housing 30 of the directive element.

This said directive element comprises the gyro wheel 31 which preferably takes the form of the rotor of an alternating current motor, and is suitably mounted for rotation at high speed about the shaft 32, which likewise constitutes a support for the stator 33 of said motor.

Secured to the shadow ring 16 concentric with the pivot stud 17 is the azimuth gear 35, which meshes with the pinion 36, rigid with the intermediate gear 37, which meshes with the pinion 38, carried by the armature shaft 39 of the servo motor 40, which is secured to the main frame 7. The said servo motor is preferably of the reversible direct current type, and is adapted to normally keep the shadow ring 16 in a substantially constant position relative to the vertical ring 20, and the directive element 31, thereby compensating for the well known frictional errors due to the ship's turning in azimuth, all as will be more fully disclosed below.

Carried by one of the horizontal trunnion sleeves 25 is an electrical contact wheel or trolley 41 which is adapted to roll upon a contact block 42, carried by the shadow ring 16.

The said contact block comprises an insulating member 43, of rubber, ivory, or other suitable material and a conducting member 44, as will be clear from Figs. 3 and 8. The said trolley 41 and block 42 together constitute a switch adapted to control the relay 47 shown diagrammatically in Fig. 8, which relay in turn controls the direction of rotation of the armature of the servo motor 40, as will now be disclosed.

Referring particularly to Fig. 8, the contact trolley 41 is joined as by the wire 45 to one end of the coil 46, of a suitable relay 47, the other end of the said coil 46 being connected as by the wire 48 with the battery or other source of current 49, which in turn is joined as by the wire 50 to the contact member 44, as will be clear from the drawings.

The relay 47 is provided with an armature 51 adapted to complete circuit between a pair of contact members 52 and 53, when the coil 46 is energized, and to complete circuit between a second pair of contact members 54 and 55, when retracted by the spring 56, upon the deënergizing of the said coil 46, as will be readily apparent.

As above stated, the servo motor 40 is of the reversible type, and I prefer to provide it with duplicate oppositely wound field coils 57 and 58, adapted to be excited alternately to produce fields of opposite polarity, which results in the reversal of the rotation of the armature 59 of the said motor, in the well known manner. To this end each field coil is controlled by one of the pairs of relay contact members, one end of the coil 57, for example, being joined as by the wire 61 to the contact member 53, and one end of the coil 58 being connected as by the wire 62 to the contact member 55. The contact members 52 and 54 are connected respectively by the wires 63 and 64 to the wire 48, leading from one side of the battery 49, and the other ends of the field coils 57 and 58 are connected together as by the wire 65 leading to one side of the armature 59, the other side of which is joined as by the wire 66 to the wire 50, leading from the other side of the battery 49.

It results from what has just been disclosed that when the trolley 41 makes contact with the member 44, current will flow from the battery 49, along wire 48, coil 46, wire 45, trolley 41, contact member 44, and wire 50 back to the battery, thus energizing the coil 46 and attracting the armature 51, and closing the circuit between the contact members 52 and 53. Current will then flow from battery 49, along wire 48, wire 63, contact member 52, armature 51, contact member 53, wire 61, field coil 57, wire 65, armature 59, wire 66, and wire 50 back to the battery. This, of course, will cause the armature 59 to revolve and through the gear connections 38, 37, 36, and 35, will turn the shadow ring 16 in such a direction as to break the contact between the trolley 41 and contact member 44, bringing the insulating member 43 over the said trolley.

The circuit through the relay coil 46, being thus broken, the said coil is deënerized and the armature 51 will be retracted by the spring 56, breaking the motor circuit between contact members 52 and 53, and making circuit between the members 54 and 55. Current will now flow from battery 49 along wire 48, wire 64, contact member 54, armature 51, contact 55, wire 62, field coil 58, (which being wound in the opposite direction, to coil 57, will produce a reverse rotation of the motor armature), wire 65, armature 59, wire 66 and wire 50 back to the battery. This reversed rotation of the motor armature 59 will of course cause the shadow ring 16 to move back so as to again bring the contact member 44 into engagement with the trolley 41, when the cycle will be repeated.

Were it commercially feasible to build a motor having a dead beat armature the constant chattering of the shadow ring thus produced might be eliminated. However, the mean position of the said shadow ring will be substantially the same as if a dead beat mechanism were employed and the oscillations are in no wise detrimental, but on the other hand tend to prevent pitting of the the balls in the anti-friction bearings 8, 13, 18, 21 and 22.

It is well known that when the ship turns in azimuth a certain amount of friction will be generated in the said bearings such as 8, 13, 21, 22 and 18, due to the fact that the directive element or gyro wheel 31 will always tend to maintain its plane of rotation, while the frame 7 and binnacle 1 are moved around it by the turning of the ship. This said friction, if uncompensated for, will produce grave errors in the indications of the compass card 70, all as is disclosed, for example, in the U. S. Patent #1253574, granted Jan. 15, 1918, to M. E. Carrie.

This said generated friction is in the present instance compensated for, and the errors which would result therefrom avoided in the following manner:—

When the ship swings in azimuth it carries with it the binnacle 1, and the main frame 7, to which is attached the servo motor 40. The said motor being geared to the shadow ring 16, as above disclosed, there will also be a tendency to turn the said ring in the direction in which the ship is turning. This, however, will cause the trolley 41 to remain in contact with one or the other of the members 43 or 44, of the block 42, for a longer period of time than would otherwise be the case, with the result that the armature 59 of the said motor 40 will be turned in a predetermined direction for a like longer period of time. The direction of this rotation is such that the ring 16 will be turned backward, or in a direction opposite to that in which the ship is turning, an amount equal to the said turning movement of the ship, so that any friction which may be generated in the bearings 8, 13, 18, 21 and 22, and cause the compass errors is overcome or compensated for by power supplied from the motor 40.

In instruments of this character, it is customary to suppress one of the degrees of freedom of the directive element in order to secure the desired orientation, and this has heretofore been accomplished by weighting the casing 30, either through the lower portion thereof, or by raising the horizontal trunnions, such as 28, above the plane of the rotative axis 32, or above the center of gravity. These methods of suppression however, have the disadvantage that when the ship rolls in a seaway, tilting the binnacle 1, such motion will ultimately be transmitted to the main frame 7 and the directive element 31, due to the friction which necessarily exists in the Cardan ring bearings. That is to say, the rolling of a ship in a seaway is more or less rhythmic, and notwithstanding the fact that the main frame 7 is pendulously mounted in anti-friction bearings, the to and fro movements of the binnacle 1 will, due to even the very small amount of friction in the said anti-friction bearings, be transmitted to the said frame 7 which will likewise rock.

Now, so long as these rocking movements are in a north and south plane little or no harm results, the frame 7 merely oscillating the rings 16 and 20 about the horizontal trunnions 28, while the directive element maintains its position. But should the rocking movements be in an east and west plane, or in fact in any plane other than the true north and south plane, any movement of the frame 7 in these planes would, through the rings 16 and 20 carried thereby, raise one of the trunnions 28 and depress the other one, the effect of which would be to raise the center of gravity of the directive element from its lowest position. The said center of gravity would of course immediately try to reassume its lowest position, and in so doing would naturally follow the path of least resistance. This would be by turning the directive element about the vertical axis 75 on the pivot bearings 21 and 22, which would of course throw the said element off its true north reading.

The above principle may perhaps be more clearly brought out by reference to Figs. 4 to 7 of the drawings which illustrate a model designed to demonstrate the same, and in which 100 diagrammatically represents the center of gravity of the directive element 70 pivoted on an axis 101, corresponding to the axis 76, in a plane somewhat above said center, and the said axis 101 is supported in a ring 102, corresponding to the vertical ring 20. The said ring 102 is pivoted as by the pivots 103 and 104, corresponding to the pivots 23 and 24 respectively, in an outer ring 105 corresponding to the main frame 7. The ring 106 is rigid with the ring 102 and being disposed at right angles thereto, it occupies the common plane of the axes 32 and 75.

If we assume that the arrow N indicates the true north point, being at right angles to the axis 101, and suppose the ship to be rolling in the direction indicated by the arrow R, in Fig. 4, at a substantial angle to the said north point, an inspection of the said figure will readily show that end 107 of the said axis 101 has been raised, while the end 108 of said axis has been lowered, and that the center of gravity 100 no longer occupies its lowest position or in other words, it does not hang vertical. Its tendency, however, will of course be to reassume its said lowest position, and before the ship rolls in the opposite direction, and the only way it can do so is by turning the rings 102 and 106 about on the vertical pivots 103 and 104, as shown in Fig. 5. It will be readily apparent from what has just been said that the axis 101 will no longer be at right angles to the arrow N, or in other words, the directive element will no longer indicate the true north.

Figs. 6 and 7 illustrate the action when the ship rolls in the opposite direction, and show that the errors produced are cumulative in effect.

The above disadvantage of the weighted directive element has been heretofore overcome in several ways, one of which is shown in my prior U. S. Patent #1311716, granted July 29, 1919, and entitled Gyroscopic compass, wherein the main frame, such as 7, is stabilized and prevented from partaking of the rolling and pitching movements of the ship by the use of suitable auxiliary stabilizing gyroscopes. Likewise, in my copending application Sr. No. 275805, filed Feb. 8, 1919, and entitled Gyroscopic compass, I have disclosed means for in effect automatically shifting the center of gravity of the directive element, so that even though the said element does partake of the rolling movements of the ship, the said center of gravity will never be raised, but will always remain in its lowest position.

On the other hand, it will be readily seen that if the center of gravity of the directive element can be made to coincide with its rotative axis, which, as here shown, lies in the common planes 75 and 76, with the Cardan pivot 6, then no matter how the said element may be turned or rocked through movements of the frame 7, about said pivot 6, the said center can never be raised, and no turning movement about the vertical axis 75 with its attendant errors be produced. It is therefore one of the principal objects of the present invention to maintain the center of gravity of the directive element coincident with its rotative axis and still secure a suppression of its movement about the horizontal axis 76, to produce orientation.

To this end, the directive element, instead of being weighted in any of the manners above mentioned, is mounted in indifferent equilibrium, i. e., the horizontal trunnions 28 lie in the common horizontal plane 76 with the rotative axis 32 and Cardan pivots 4 and 6, and the entire element is accurately balanced thereon so that it will remain in any position in which it may be placed. To assist in the balancing of the said element suitable adjustable weights such as 109 may be provided on the casing 30, if desired. The gyro wheel is thus mounted with three degrees of freedom, in that it may rotate freely about the axis 32, and at the same time may revolve about the axis 76 on the trunnions 28, as well as about the axis 75 on the pivots 23 and 24.

Mounted within the vertical ring 20, directly above the vertical pivot bearing 22, and preferably concentric therewith, is a magnetic means 110. This said means may comprise a permanent magnet, but is here shown as an electromagnet, provided with a core 111, and a coil 112, having suitable leads 113 connected with a source of current supply, not shown. Carried by the casing 30 is a suitable armature or keeper 114, adapted to be acted upon by the magnetism from the magnet 110 to normally keep the said casing 30 in the same vertical plane as the vertical ring 20 but which will permit under certain circumstances of relative movement between the two.

As above stated, the frame 7 is pendulously mounted in the Cardan ring 5, and will therefore always tend to hang vertical, or with its center of gravity in its lowest position. It will however be more or less subject to the rolling and pitching movements of the ship, and will at times partake of such movements. Such movements in a north and south plane, as above pointed out, will cause substantially no trouble and further, since the center of oscillation of the said frame 7, in an east and west plane will be about the pivots 6, which coincide with the rotative axis 32 of the directive element and therefore with its center of gravity, a little reflection will show that the said center of gravity of said element can never be raised. In other words, the oscillation in an east and west plane will always be about the center of gravity of the directive element and therefore no turning moment about the vertical axis 75 will ever be produced, with its resulting erroneous compass readings.

On the other hand, the magnetic attraction between the pole piece 111 and the keeper 114 will provide the necessary suppression of the freedom of movement of the directive element about the horizontal axis 76, producing the necessary orientation of the said element, and which has heretofore been secured by means of the gravity couple produced by weighting the casing 30.

As is well known in machines of this type, the directive element is subject to certain oscillations in azimuth, which it is customary to damp out through the use of suitable damping devices. The form of this invention shown in Figs. 1 to 3 is adapted for use with any of the well known damping devices, and therefore, I have not there illustrated any particular means of destroying the said azimuth oscillations.

It is obvious that those skilled in the art may vary the details of construction as well as the arrangement of parts without departing from the spirit of the invention, and, therefore, I do not wish to be limited to the above disclosure except as may be required by the claims.

What I claim is:—

1. In a gyro compass the combination of a gyro wheel; means to support said wheel with three degrees of freedom; and magnetic means on said supporting means for suppressing one of said degrees of freedom, substantially as described.

2. In a gyro compass the combination of a frame; a gyro wheel mounted in said frame, adapted to rotate about an axis and to move about two other axes each at a substantial angle to said first axis and to each other; and magnetic means on said frame for suppressing freedom of movement of said wheel about one of said axes; whereby orientation thereof is produced, substantially as described.

3. In a gyro compass the combination of a pendulous frame; a support for said frame adapted to turn in azimuth; a gyro wheel mounted in said frame, adapted to rotate about an axis and to move freely about an axis at a substantial angle to said first axis; means to compensate for friction generated when said support and frame are turned in azimuth; and magnetic means on said ring for suppressing the freedom of movement of said wheel about said second axis, substantially as described.

4. In a gyro compass the combination of a support adapted to be turned in azimuth; a frame pendulously mounted in said support; a ring pivoted in said frame; a balanced directive element trunnioned in said ring; means for compensating for friction generated in said pivots when said support and frame are turned in azimuth; and magnetic means on said ring for suppressing movement of said element about its said trunnions, whereby orientation thereof is produced, substantially as described.

5. In a gyro compass the combination of a support adapted to be turned in azimuth; a frame pendulously mounted in said support, a ring pivoted in said frame; a balanced directive element trunnioned in said ring at a substantial angle to said pivots; power operated means for compensating for any friction generated in said pivots when said support and frame are moved relatively to said ring; and magnetic means on said ring adapted to suppress movement of said element about its said trunnions, thereby producing orientation of the element, substantially as described.

6. In a gyro compass the combination of a support; a frame pendulously mounted in said support; and provided with vertical pivots; a ring carried by said pivots and provided with horizontal trunnions; a balanced directive element mounted to freely rotate about said trunnions; means including a second ring and a power motor adapted to compensate for friction generated in said vertical pivots due to the movement of said frame relatively to said first ring; and magnetic means carried by said first ring adapted to suppress movement of said element about said horizontal trunnions and to thereby cause orientation of said element, substantially as described.

In testimony whereof I affix my signature.

GEORGE A. ROSSITER.